United States Patent
Di Giusto et al.

(10) Patent No.: US 9,555,741 B2
(45) Date of Patent: Jan. 31, 2017

(54) PIVOT MECHANISM FOR A VEHICLE EXTERNAL REAR VIEW MIRROR ASSEMBLY

(71) Applicant: SMR Patents S.A.R.L., Luxembourg (LU)

(72) Inventors: Nathan Di Giusto, Lonsdale (AU); Simon Orme, Lonsdale (AU); Simon Belcher, Lonsdale (AU); Daniel Flynn, Lonsdale (AU)

(73) Assignee: SMR Patents S.a.r.l., Luxembourg (LU)

( * ) Notice: Subject to any disclaimer, the term of this patent is extended or adjusted under 35 U.S.C. 154(b) by 0 days.

(21) Appl. No.: 14/889,685

(22) PCT Filed: May 7, 2014

(86) PCT No.: PCT/IB2014/061261
§ 371 (c)(1),
(2) Date: Nov. 6, 2015

(87) PCT Pub. No.: WO2014/181265
PCT Pub. Date: Nov. 13, 2014

(65) Prior Publication Data
US 2016/0114729 A1      Apr. 28, 2016

(30) Foreign Application Priority Data

May 8, 2013   (AU) .................................. 2013901634

(51) Int. Cl.
*B60R 1/06*          (2006.01)
*B60R 1/076*         (2006.01)

(52) U.S. Cl.
CPC .................. *B60R 1/06* (2013.01); *B60R 1/076* (2013.01); *Y10T 16/54028* (2015.01)

(58) Field of Classification Search
CPC .......... B60R 1/06; B60R 1/076; B60R 1/0617; B60R 1/074; Y10T 16/54028; Y10T 16/54044; E05D 11/1071; E05D 11/1085
(Continued)

(56) References Cited

U.S. PATENT DOCUMENTS

| | | |
|---|---|---|
| 1,595,557 A | 8/1926 | Mamiya |
| 3,119,591 A | 1/1964 | Malecki |

(Continued)

FOREIGN PATENT DOCUMENTS

| | | |
|---|---|---|
| DE | 123169 | 12/1975 |
| EP | 0527455 A1 | 2/1933 |

(Continued)

OTHER PUBLICATIONS

PCT International Search Report, Application No. PCT/IB2014/061261, dated Jul. 28, 2014.

*Primary Examiner* — William Miller
(74) *Attorney, Agent, or Firm* — MacMillan, Sobanski & Todd, LLC

(57) ABSTRACT

A pivot mechanism for a vehicle external rear view mirror assembly is disclosed. The mechanism includes: a base frame portion and a case frame portion mounted to the base frame portion for rotation about a pivot axis. A detent operable between the base frame portion and the case frame portion is provided. The detent has an engaged position and a disengaged position, the disengaged position allowing the rotation about the pivot axis. A spring mechanism clamps the case frame portion to the base frame portion and a first set of detent features to a second set of detent features. A support arm having an attachment end and a floating end is provided. An attachment end is fixed to, and is fixed against rotation with respect to the case frame portion, and the (Continued)

second set of detent features is fixed against rotation with respect to the base frame portion.

12 Claims, 17 Drawing Sheets

(58) Field of Classification Search
USPC ....... 16/334, 344; 248/475.1, 476, 477, 478; 359/841, 871, 872
See application file for complete search history.

(56) References Cited

U.S. PATENT DOCUMENTS

| | | | |
|---|---|---|---|
| 3,339,876 A | 9/1967 | Kampa | |
| 3,384,334 A | 5/1968 | Malachowski | |
| 3,637,186 A | 1/1972 | Greenfield | |
| 4,186,905 A | 2/1980 | Brudy | |
| 4,789,232 A * | 12/1988 | Urbanek | B60R 1/076 248/475.1 |
| 4,829,633 A | 5/1989 | Kassner | |
| 5,143,468 A | 9/1992 | Pausch | |
| 6,092,778 A | 7/2000 | Lang et al. | |
| 6,244,779 B1 | 6/2001 | Slasinski | |
| 6,286,968 B1 * | 9/2001 | Sailer | B60R 1/0617 248/478 |
| 6,742,756 B1 * | 6/2004 | Fimeri | B60R 1/074 248/478 |
| 7,137,715 B2 | 11/2006 | Schuurmans et al. | |
| 7,331,552 B2 | 2/2008 | Sample | |
| 7,393,111 B2 | 7/2008 | Fuchs et al. | |
| 7,452,088 B2 * | 11/2008 | Brester | B60R 1/076 248/478 |
| 7,546,997 B2 * | 6/2009 | Van Stiphout | B60R 1/079 248/476 |
| 7,686,274 B2 * | 3/2010 | Branham | B60R 1/0617 248/477 |
| 7,887,202 B1 * | 2/2011 | Peterson | B60R 1/074 359/841 |
| 8,157,395 B2 * | 4/2012 | Itoh | B60R 1/074 359/872 |
| 8,336,845 B1 * | 12/2012 | Courbon | B60R 1/076 248/479 |
| 8,720,845 B2 * | 5/2014 | Courbon | B60R 1/0612 16/343 |
| 2007/0165315 A1 * | 7/2007 | Proctor | B60R 1/076 359/871 |

FOREIGN PATENT DOCUMENTS

| | | |
|---|---|---|
| EP | 0641686 A2 | 3/1995 |
| WO | 2005079535 A2 | 9/2005 |

* cited by examiner

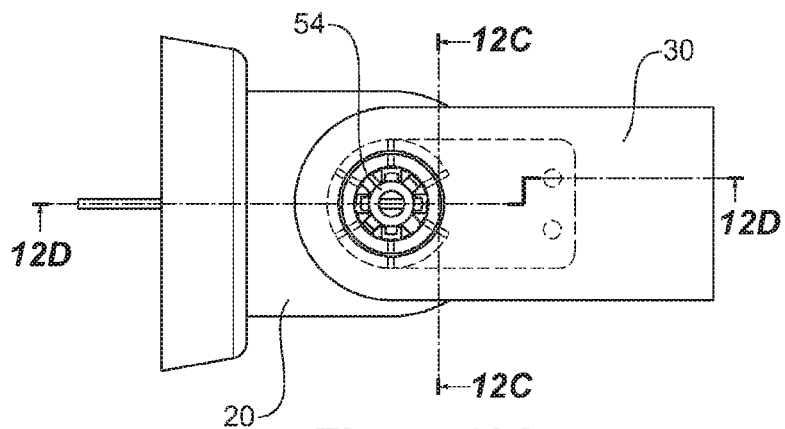
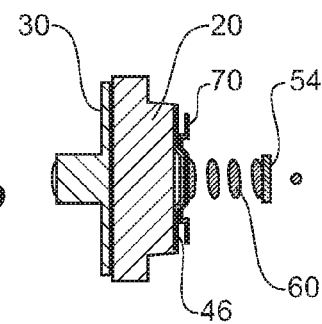
Figure 12A
Figure 12C
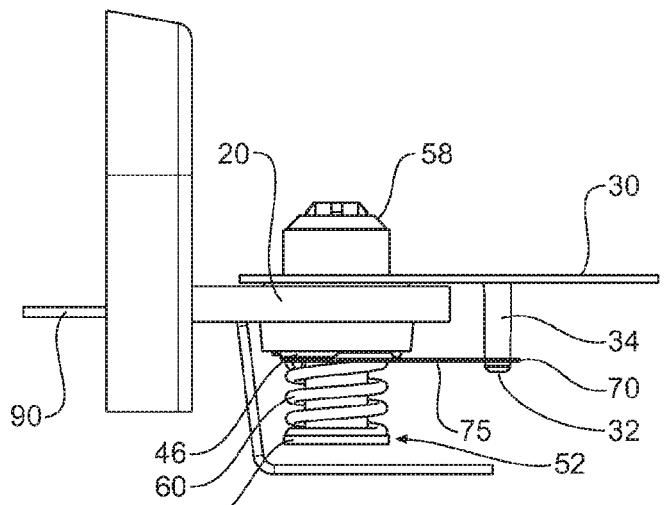
Figure 12B
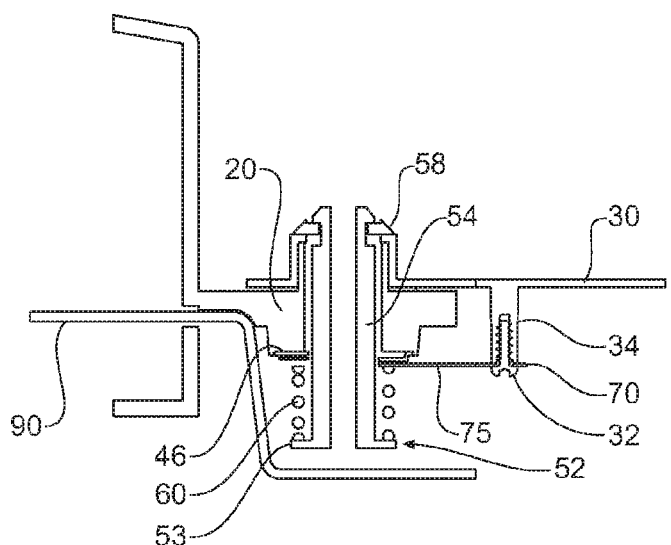
Figure 12D

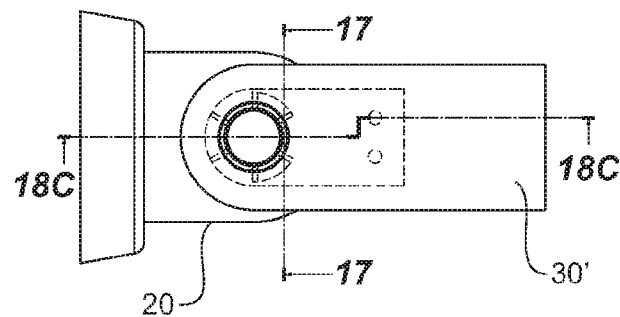
Figure 18A
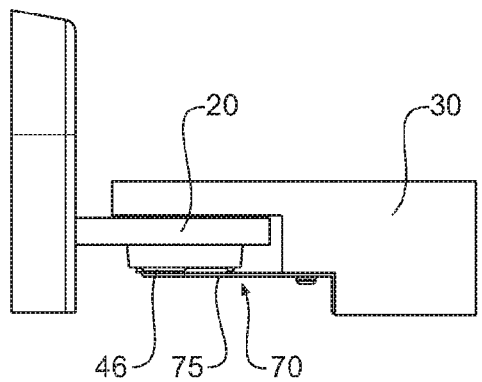
Figure 18B
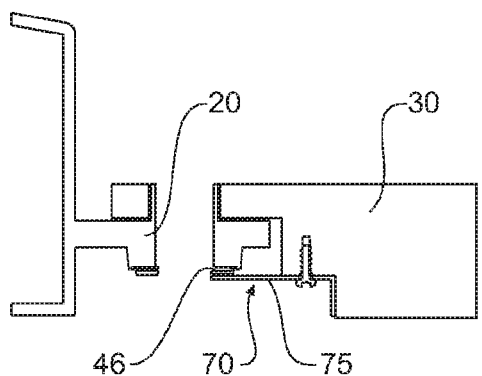 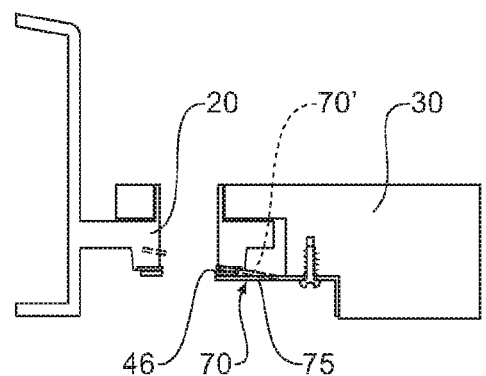
Figure 18C                Figure 18D

PIVOT MECHANISM FOR A VEHICLE EXTERNAL REAR VIEW MIRROR ASSEMBLY

CROSS-REFERENCE TO RELATED APPLICATIONS

This application is the National Phase of International Application PCT/IB2014/061261 filed May 7, 2014 which designated the U.S. and was published on Nov. 13, 2014 as International Publication Number WO/2014/181265. PCT/IB2014/061261 claims priority to Australian Patent Application No. 2013901634, filed May 8, 2013. The disclosures of these applications are incorporated herein by reference.

BACKGROUND OF THE INVENTION

This invention relates in general to vehicle review view mirrors. In a particular form the present invention relates to vehicle review view side mirrors that are pivotably movable with respect to a mounting point on a vehicle.

Vehicle mirrors, in particular vehicle rear view side mirrors, commonly include a mirror head that is pivotally attached to a mounting bracket. The mounting bracket is secured to the vehicle body (for instance, the door or front fender). The pivot enables the mirror head to rotate with respect to the bracket to either allow movement of the mirror head in response to an impact while the vehicle is moving or stationary (referred to as "mirror breakaway"), or to move to a parked position under the action of a drive means to ensure that the mirror head is moved to a position where it is as close to the vehicle body as possible.

A detent is typically included in a pivot mechanism within the vehicle mirror described above. The detent provides a positive location and holding force for the mirror in at least a deployed or drive position as it is rotated about the pivot. The detent resists initial movement of the pivot and requires a minimum force in order to overcome the detent holding force.

Commonly, detent mechanisms include a detent feature on the mounting bracket or mirror base and a further detent feature on the mirror head or mirror case frame. With such an arrangement, typically the mirror head is displaced upwards as it rotates out of detent.

In some applications, it is desirable to provide a pivot mechanism whereby there is no axial lifting of the mirror head with respect to the base during rotation or pivoting.

The invention to provides a pivot mechanism that provides swivel or rotary motion of the mirror head without an axial movement component or to at least provide the public with a useful choice.

SUMMARY OF THE INVENTION

This invention relates to a pivot mechanism for a vehicle external rear view mirror assembly, the mechanism including:

a base frame portion integral with, or attachable to, a vehicle-mountable base frame;

a case frame portion mounted to the base frame portion for rotation about a pivot axis, the case frame portion integral with, or attachable to, a case frame adapted to support a rear vision mirror;

a detent operable between the base frame portion and the case frame portion, the detent having:

an engaged position where the case frame portion is held in a selected position with respect to the base frame portion, and a disengaged position allowing the rotation about the pivot axis, the detent including a first set of detent features and a second set of detent features;

a spring mechanism clamping the case frame portion to the base frame portion and the first set of detent features to the second set of detent features; and a support arm having an attachment end and a floating end, the floating end supporting the first set of detent features, the first set of detent features fixed against rotation about the pivot axis with respect to the support arm, but displaceable relative to the attachment end in a direction substantially parallel to the pivot axis, wherein the attachment end of the support arm is fixed to, and is fixed against rotation with respect to, one of: the case frame portion and the base frame, and wherein the second set of detent features is fixed against rotation with respect to the other of: the case frame portion and the base frame portion.

In one embodiment, the spring mechanism provides a first clamping force clamping the case frame portion to the base frame portion and a second clamping force clamping the first set of detent features to the second set of detent features, the first and second clamping forces being of equal magnitude.

In one embodiment, the first and second clamping forces are higher in the disengaged position than they are in the engaged position.

In one embodiment, the spring mechanism includes:
a compression spring; and
a spring tie, the spring tie having a first tie end and a second tie end, the a first and second tie ends spaced apart from each other and connected by a tie portion, the tie portion passing through the spring.

In one embodiment, the spring mechanism includes a resilient arm portion, the resilient arm portion between the attachment end and the floating end of the support arm.

In one embodiment, the first and second clamping forces arise from the sum of a first spring force produced by the compression spring and a second spring force produced by the resilient arm portion.

In one embodiment, the support arm and the first set of detent features are formed as a unitary component.

In one embodiment, the support arm and the first set of detent features are formed from spring steel.

In one embodiment, the relative axial positions of the base frame portion and the case frame portion remain unchanged from between the engaged position and the disengaged position.

In one embodiment, the spring mechanism includes:
a resilient arm portion, the arm resilient arm portion between the attachment end and the floating end of the support arm.

In one embodiment, the spring mechanism consists of the arm portion, the arm portion including a resilient arm portion between the attachment end and the floating end of the support arm.

In one embodiment, the attachment end of the support arm is attached to the case frame portion.

Various aspects of this invention will become apparent to those skilled in the art from the following detailed description of the preferred embodiment, when read in light of the accompanying drawings.

BRIEF DESCRIPTION OF THE DRAWINGS

FIG. 5A shows the pivot mechanism of FIGS. 1 and 2 in a top view in a position departing the drive detent.

FIG. 5C shows the pivot mechanism of FIGS. 1 and 2 in a cross-sectional view taken through section lines 5C-5C, as indicated on FIG. 5A.

FIG. 6A shows the pivot mechanism of FIGS. 1 and 2 in a top view in the out of detent position.

FIG. 6C shows the pivot mechanism of FIGS. 1 and 2 in a cross-sectional view taken through section lines 6C-6C, as indicated on FIG. 6A.

FIG. 12A shows the pivot mechanism of FIGS. 1 and 2 in a top view in the drive detent position.

FIG. 12B shows the pivot mechanism of FIGS. 10 and 11 in a side view in the drive detent position.

FIG. 12C shows the pivot mechanism of FIGS. 1 and 2 in a cross-sectional view taken through section lines 12C-12C, as indicated on FIG. 12A.

FIG. 12D shows the pivot mechanism of FIGS. 1 and 2 in a cross-sectional view taken through section lines 12D-12D, as shown in FIG. 12A.

FIG. 18A shows the pivot mechanism of FIG. 16 in a top view in a position departing the drive detent.

FIG. 18B shows the pivot mechanism of FIG. 16 in a side view in a position departing the drive detent.

FIG. 18C-D shows the pivot mechanism of FIG. 16 in a cross-sectional view taken through section lines 18C-18C, as indicated on FIG. 18A.

DETAILED DESCRIPTION OF THE PREFERRED EMBODIMENT

Figure 1:
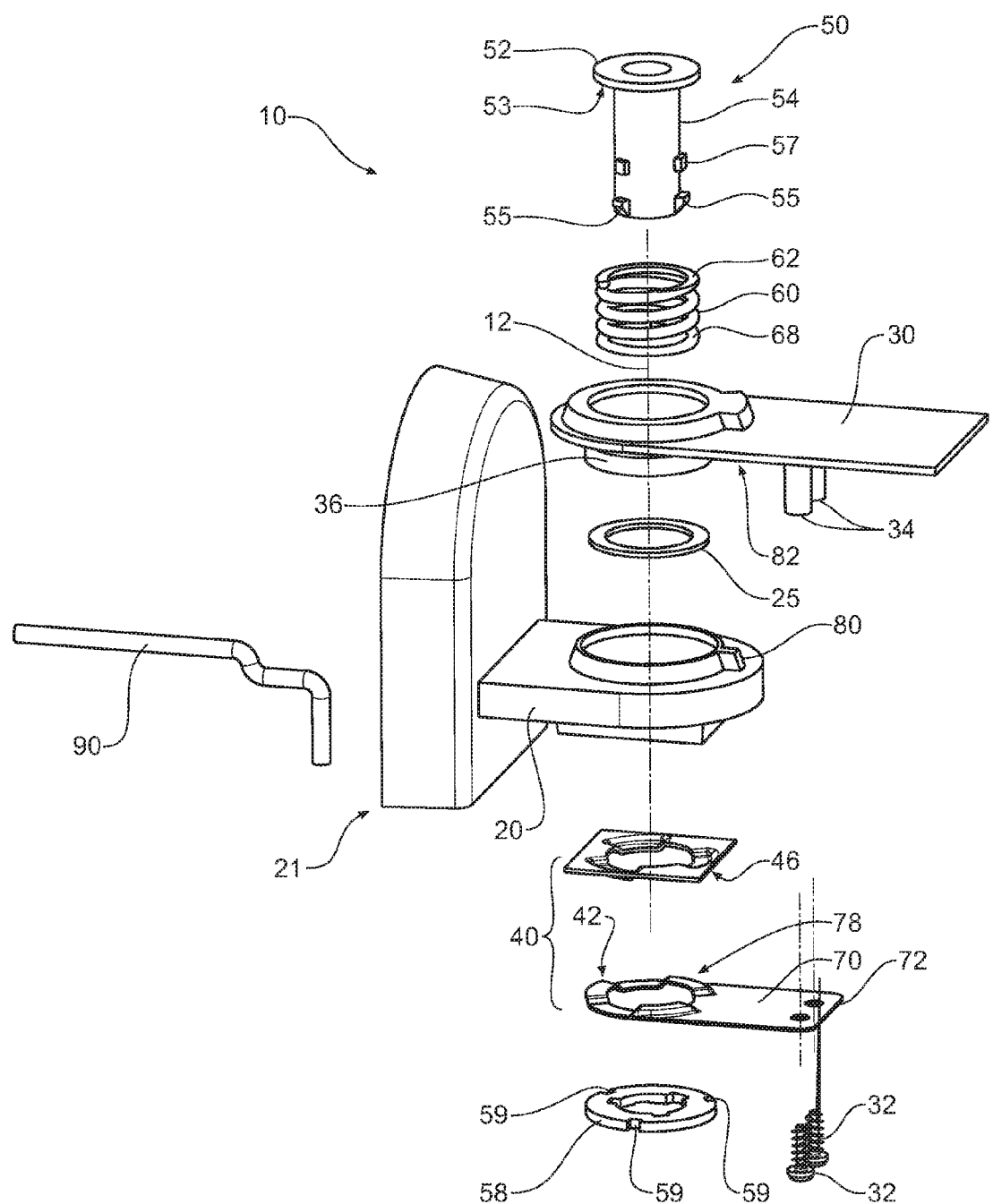
FIG. 1 is an exploded isometric view of a pivot mechanism according to the invention.
Figure 2:
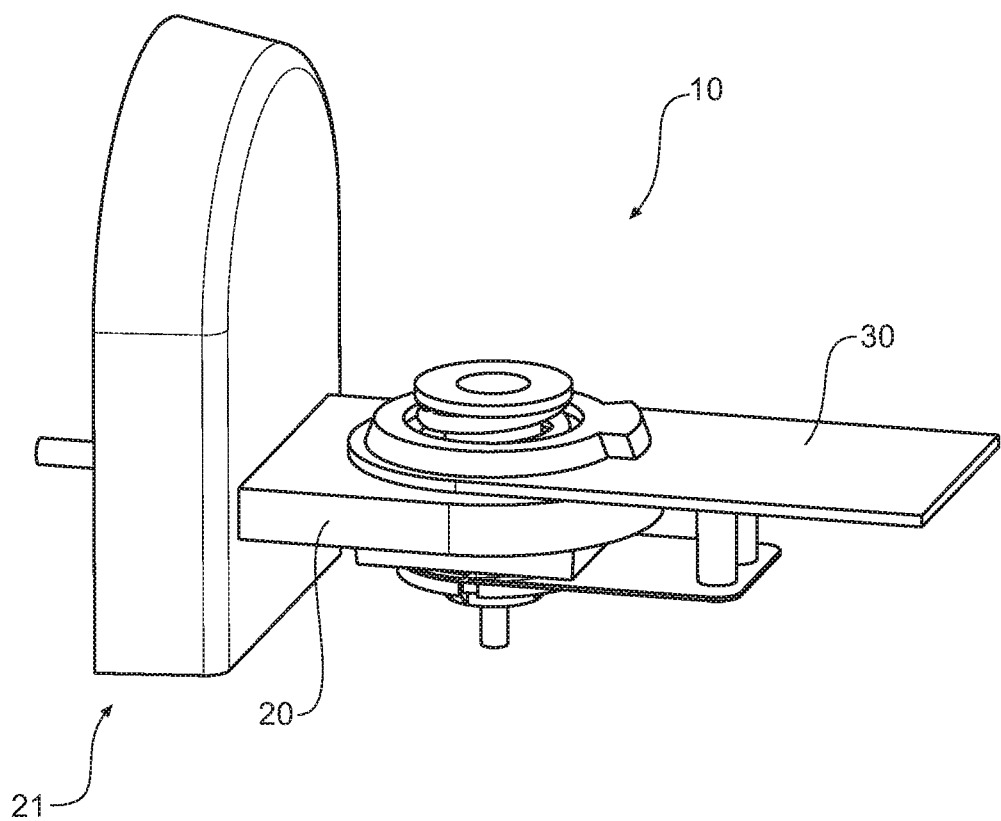
FIG. 2 is an isometric view of a pivot mechanism shown in FIG. 1.

Referring now to FIGS. 1 and 2, there is shown a pivot mechanism 10 for a vehicle external rear view mirror assembly. The mechanism includes a base frame portion 20 for a vehicle-mountable base frame and a case frame portion 30 mounted to the base frame portion 20 for rotation about a pivot axis 12. The base frame portion 20 may be integral with a base frame, or may be a separate component attached to, or attachable to, other base frame portions. Similarly, the case frame portion 30 may be integral with a case frame, or may be a separate component attached to, or attachable to, other case frame portions.

Typically, the case frame supports a mirror and a decorative case housing. The case frame, mirror and decorative housing are all rotatable together with respect to the base frame, which is typically fixed to a vehicle door.

A detent 40 operable between the base frame portion 20 and the case frame portion 30 is provided. The detent 40 has an engaged position shown in FIGS. 2, 3A, 4A, 4B, 4C and 4D. In this engaged position, the case frame portion 30 is held in a selected position with respect to the base frame portion 20. The detent also has a disengaged position illustrated in FIGS. 3B, 6A, 6B and 6C, allowing rotation about the pivot axis 12.

The detent 40 includes a first set of detent features 42 and a second set of detent features 46. The first set of detent features 42 are fixed against rotation about the pivot axis 12 but is axially movable with respect to both the case frame portion 30 and the base frame portion 20. The second set of detent features 46 are fixed against rotation with respect to the base frame portion 20. A spring assembly including a spring retainer or spring tie 50 and a spring 60 clamps the case frame portion 30 to the base frame portion 20 and also clamps the first set of detent features 42 to the second set of detent features 46.

The pivot mechanism 10 also includes a detent member support arm 70, having a first attachment end 72 and a second floating end 78. The first attachment end 72 is mounted to the case frame portion 30 for rotation therewith. The second floating end 78 is displaceable relative to the case frame portion 30 in a direction substantially parallel to the pivot axis 12.

The spring assembly includes a spring retainer or spring tie 50 having a first retaining end 52 and a second retaining end 58, the first and second retaining ends 52,58 spaced apart from each other, and a compression spring 60 having a first spring end 62 and a second spring end 68. The spring assembly is disposed between a flange 53 of the first retaining end 52 of the spring tie 50 and the case frame 30, as is most clearly shown in the cross-sectional views of FIG. 3A and 3B read together with the exploded view of FIG. 1. The first spring end 62 bears against the first retaining end 52 of the spring tie 50 and the second spring end 68 bears against the case frame 30.

Figure 3A:
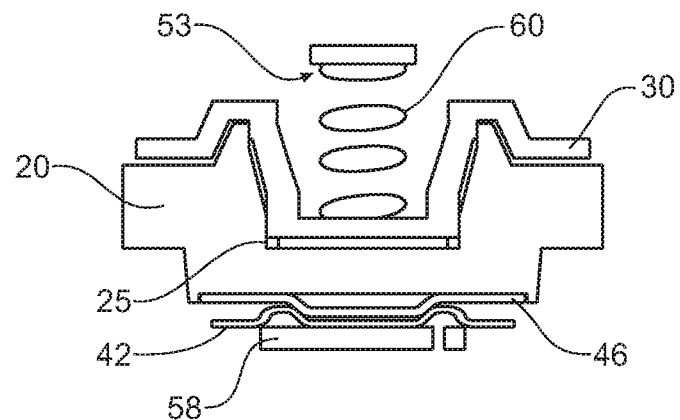
FIGS. 3A and 3B are cross-sectional views of the pivot mechanism shown in FIGS. 1 and 2, showing the pivot mechanism in a deployed or drive position and an out of detent position respectively.
Figure 3B:
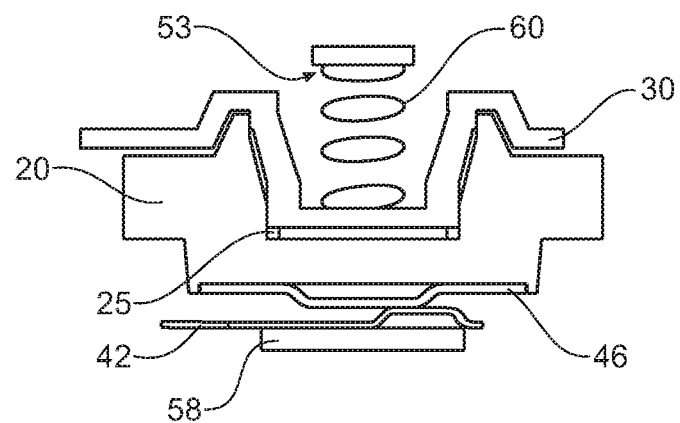

A bearing washer 25 is disposed between the second spring end 68 and the case frame 30, as is most clearly shown in FIGS. 3A and 3B.

Referring now to FIGS. 1, 3A and 3B, the detent 40 will be described in more detail.

In FIG. 3A, it can be seen that the first set of detent features 42 is pressed into engagement with the second set of detent features 46 through the clamping force generated between the second retainer end 58 and the base frame 20. This clamping force is generated by the spring 60, which pushes against the flange 53 of the first retaining end 52 of the spring tie 50. This upwards force is transmitted through a tie in the form of a tube 54 (as shown in FIG. 1) to the second retainer end 58 of the spring tie 50. The second retainer end 58 pushes upwards to press the first set of detent features 42 against the second set of detent features 46.

Figure 4A:
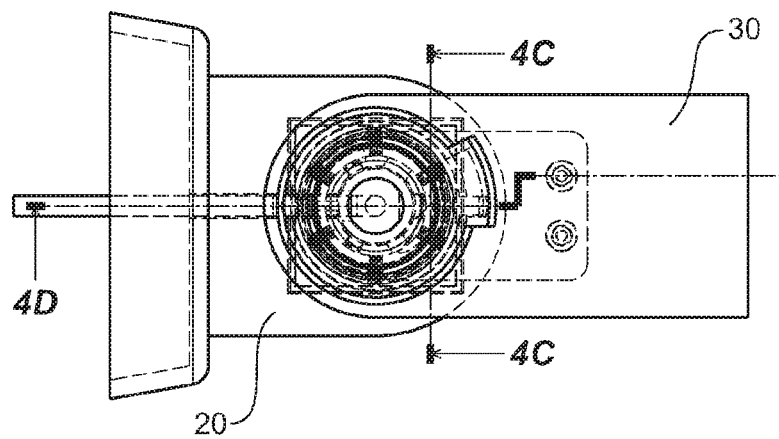
FIG. 4A shows the pivot mechanism of FIGS. 1 and 2 in a top view in the drive detent position.
Figure 4C:
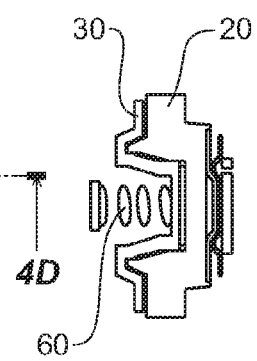
FIG. 4C shows the pivot mechanism of FIGS. 1 and 2 in a cross-sectional view taken through section lines 4C-4C, as indicated on FIG. 4A.
Figure 4B:
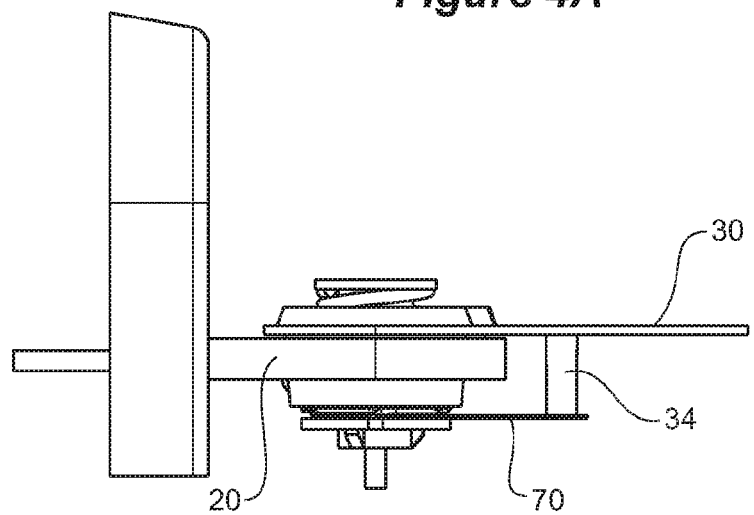
FIG. 4B shows the pivot mechanism of FIGS. 1 and 2 in a side view in the drive detent position.
Figure 4D:
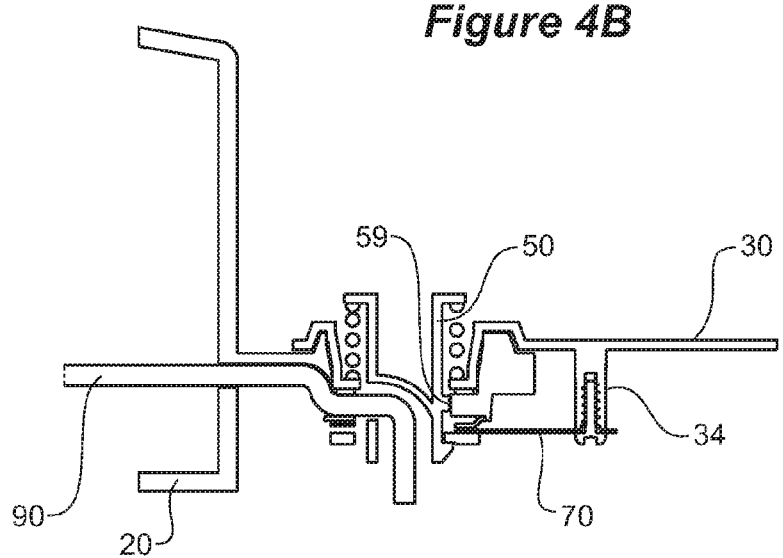
FIG. 4D shows the pivot mechanism of FIGS. 1 and 2 in a cross-sectional view taken through section lines 4C-4C, as shown in FIG. 4A.

Turning to FIGS. 4A, 4B, 4C and 4D, it can be seen that the first set of detent features 42 is mounted on a detent member support arm 70 (most clearly shown in FIGS. 4B and 4D). The detent member support arm 70 is attached to screw receiving bosses 34 by screws 32, as is most clearly shown in FIGS. 1 and 4D.

Figure 5B:
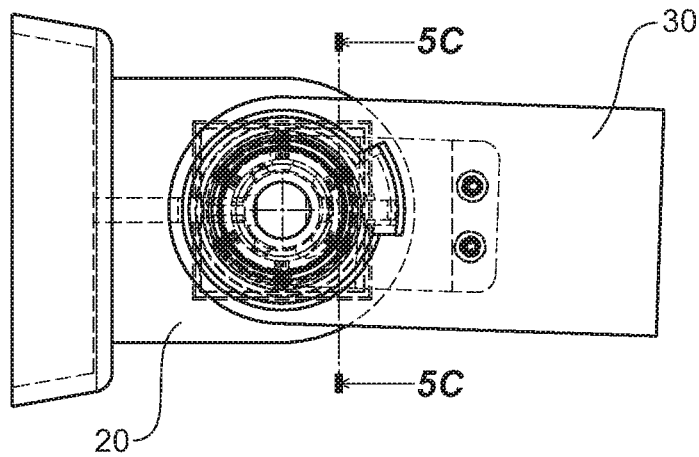
FIG. 5B shows the pivot mechanism of FIGS. 1 and 2 in a side view in a position departing the drive detent.
Figure 5B:
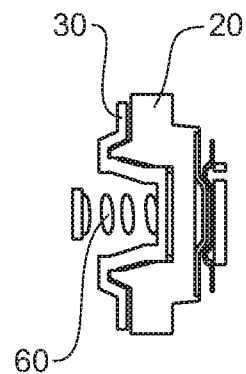
Figure 5B:
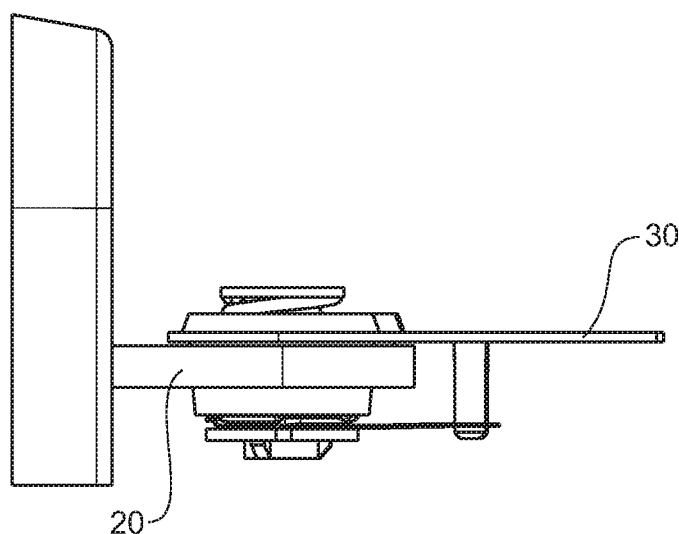
Figure 6B:
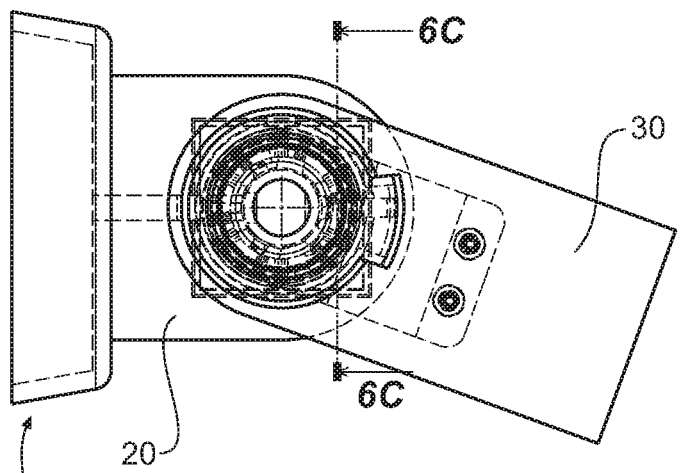
FIG. 6B shows the pivot mechanism of FIGS. 1 and 2 in a side view in the out of detent position.
Figure 6B:
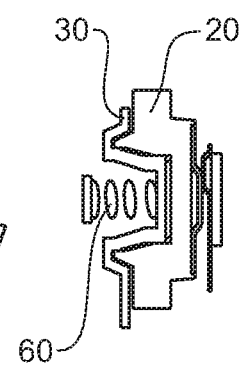
Figure 6B:
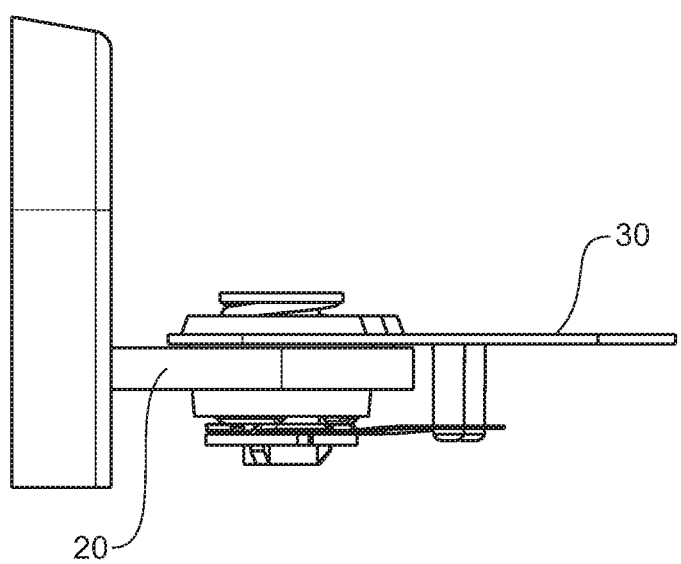
Figure 7:
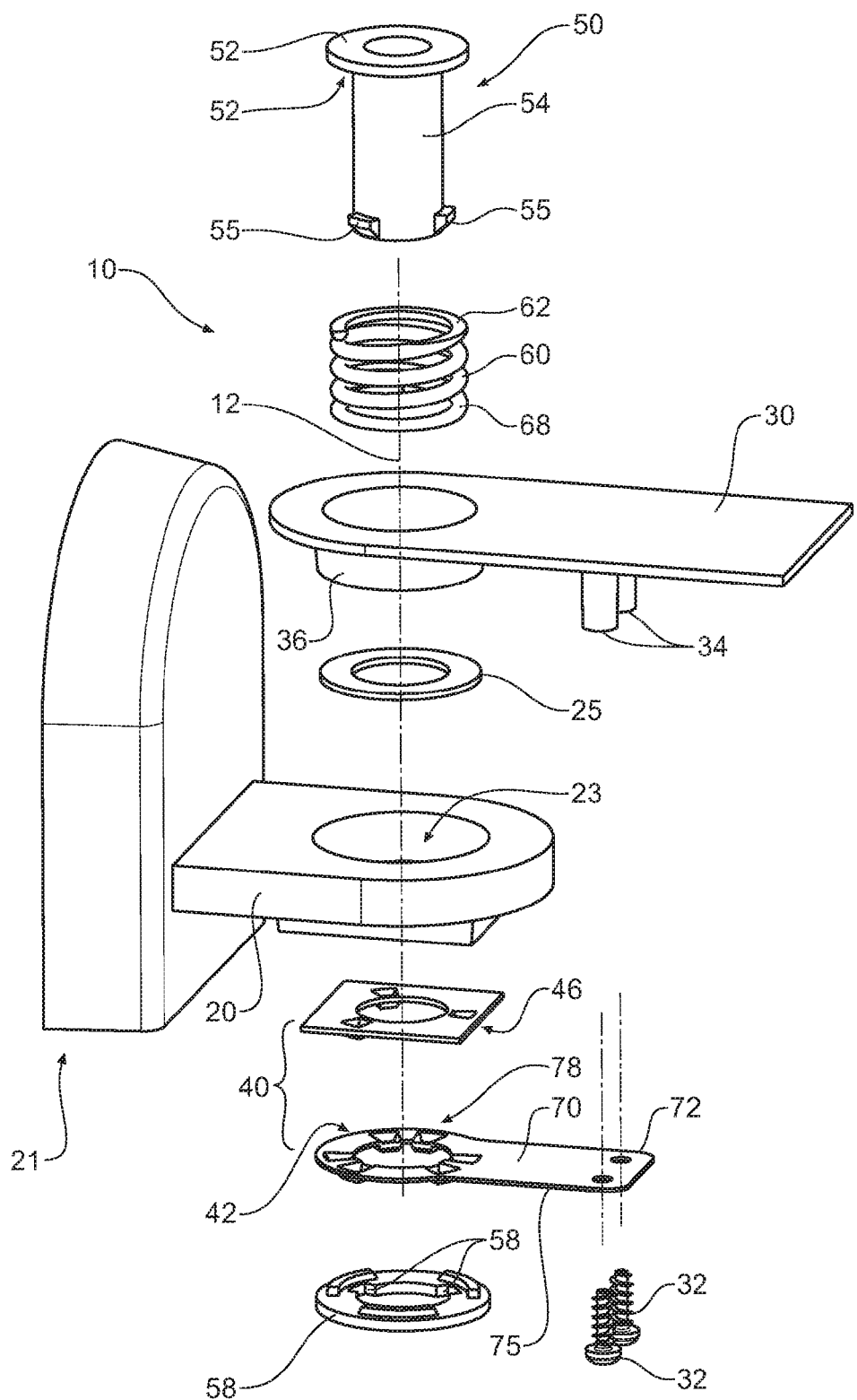
FIG. 7 is similar to FIG. 1 but shows an exploded isometric view of a pivot mechanism according to an alternative embodiment of the invention.
Figure 8:
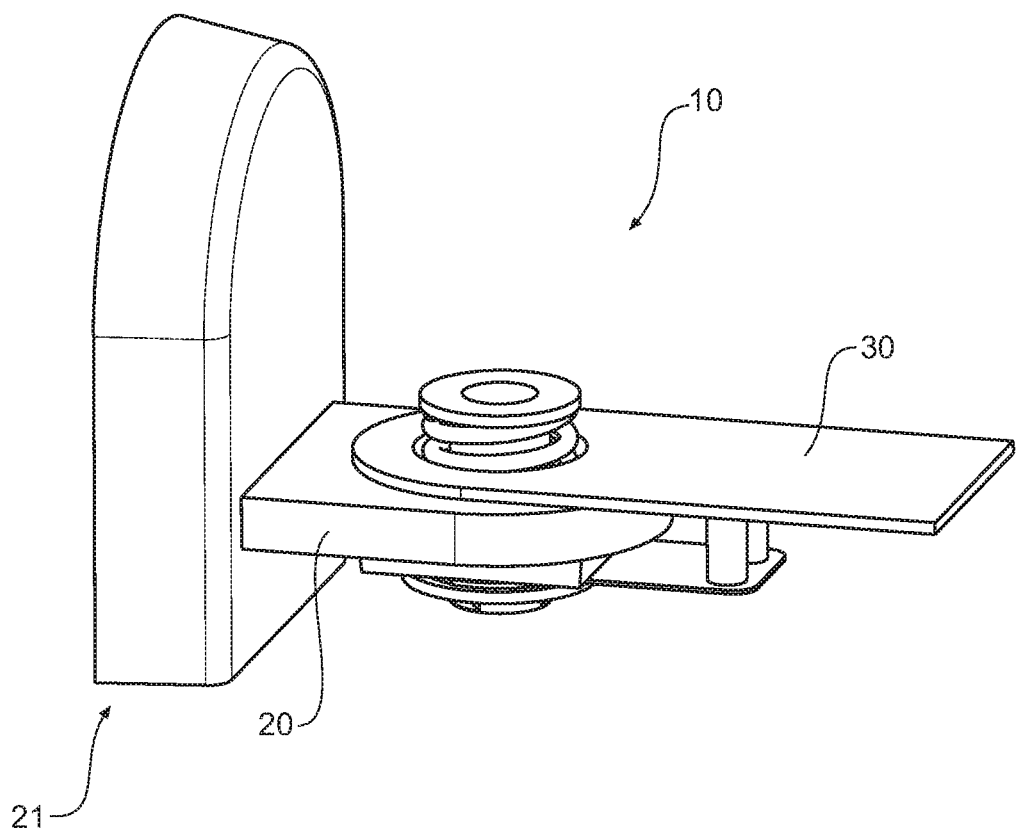
FIG. 8 is a similar view to FIG. 2 but shows an isometric view of the pivot mechanism of FIG. 7.
Figure 9A:
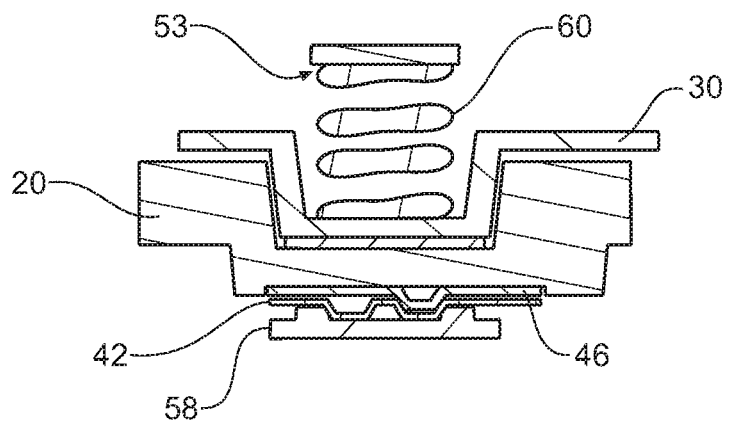
FIGS. 9A and 9B are cross-sectional views of the pivot mechanism shown in FIGS. 7 and 8 showing the pivot mechanism in a deployed or drive position and out of detent position respectively.
Figure 9B:
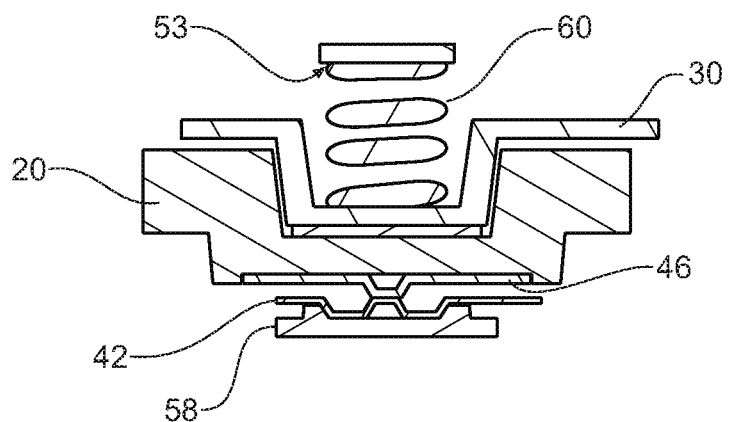

The detent member support arm 70 is flexible, allowing the first set of detent features 42 to move axially away from the second set of detent features 46 into the position shown in FIG. 3B. The detent member support arm 70 is, however, relatively inflexible against rotational movement with respect to the case frame 30. The progressive axial movement of the support arm 70 is shown from FIGS. 5A5A, 5B and 5C, departing the drive detent, to FIGS. 6A, 6B and 6d, which show the relative positions out of the detent.

The spring force acting on the detent 40 equals the spring force clamping the case frame portion 30 to the base frame portion 20. This holds true in the detent position and in the out of detent position.

In other embodiments, not shown, the first and second detent members 42 and 46 may be swapped around such that the first set of detent features 42 sits on a support arm that allows radial movement with respect to the base frame portion 20 and the second set of detent features 46 may be fixed to the case frame 30.

Referring again to FIG. 1, a travel limiting projection 80 and a travel limiting recess 82 is shown. The travel limiting projection 80 is fixed with respect to the base frame portion 20 and the travel limiting recess 82 is fixed with respect to the case frame portion 30. In other embodiments, not shown, alternative travel limiting features may be used. Travel limiting features may limit the rotational travel of the case frame (and hence the mirror head) with respect to the base frame (and hence the vehicle) according to the specifications for the particular vehicle.

The spring tie 50 is splined to the base frame portion 20 by spline projections 57, most clearly shown in FIG. 1, that are received by cut outs 59 that are most clearly shown in the cross-sectional view of FIG. 4D. By fixing the spring tie 50 against rotation with respect to the base frame 20, a wiring harness 90 can be routed from the base frame portion 20 into the spring tie 50 and then out into the mirror case supported by the mirror case frame portion 30, as is best illustrated in the cross-sectional view of FIG. 4D. The spring tie 50 illustrated in FIG. 4D provides for lateral entry of the wiring harness 90 into the spring tie tube 54. In an alternative arrangement the spring tie 50 has simple straight-though internal bore that allows straight-through routing of the wiring harness 90 through the spring tie tube 54.

Referring now to FIGS. 7, 8, 9A and 9B, an alternative embodiment of the invention is shown. With this embodiment of the invention, the spring tie 50 is not splined against rotation with respect to the base frame portion 20. In particular applications, the embodiment shown in FIGS. 7, 8, 9A and 9B may be used.

Figure 10:
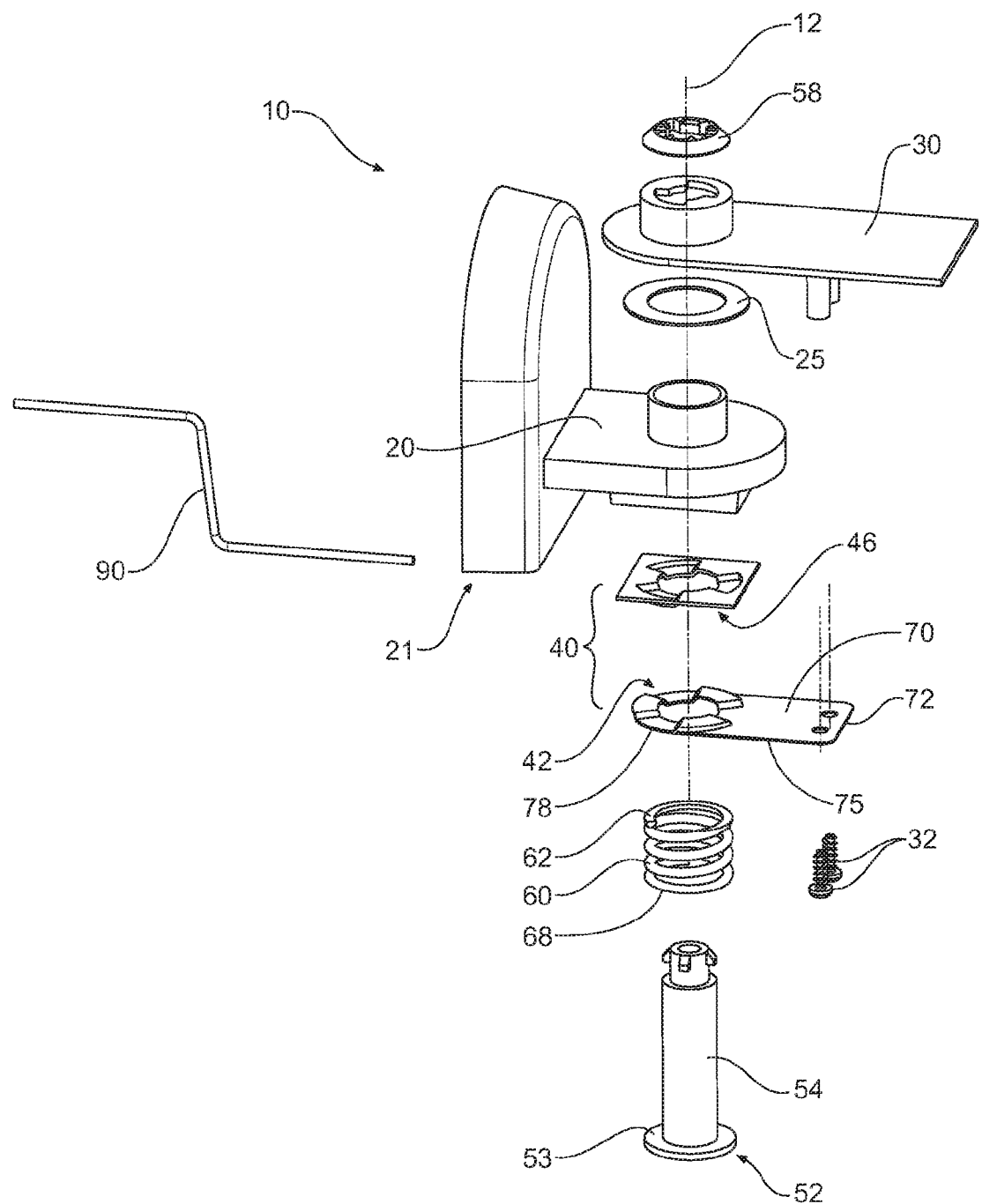
FIG. 10 is a similar view to FIGS. 1 and 7 but shows an exploded isometric view of a pivot mechanism according to a further alternative embodiment of the invention.

Referring to FIG. 10, an alternative embodiment of the invention is shown. With this embodiment of the invention, the spring 160 is positioned on the opposite side of the first set and second set of detent features as compared to the embodiments shown in FIGS. 1 to 9B.

Figure 11:
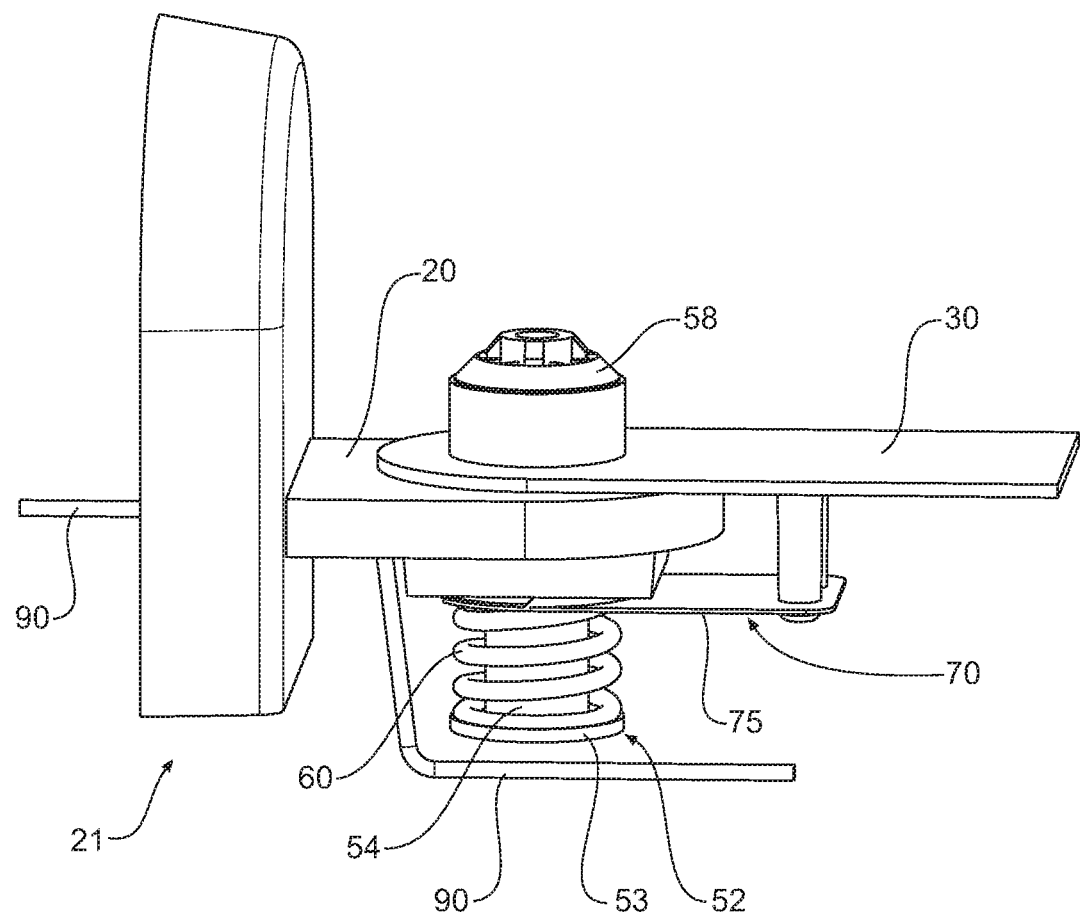
FIG. 11 is an isometric view of a pivot mechanism shown in FIG. 10.
Figure 13A:
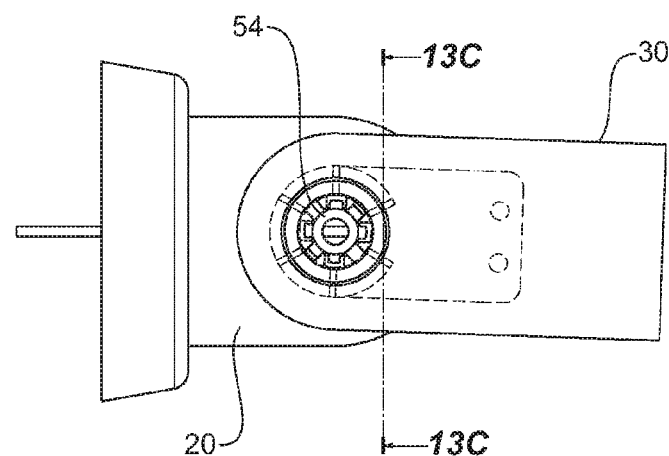
FIG. 13A shows the pivot mechanism of FIGS. 10 and 11 in a top view in a position departing the drive detent.
Figure 13C:
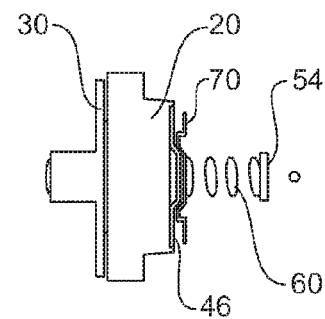
FIG. 13C shows the pivot mechanism of FIGS. 10 and 11 in a cross-sectional view taken through section lines 13C-13C, as indicated on FIG. 13A.
Figure 13B:
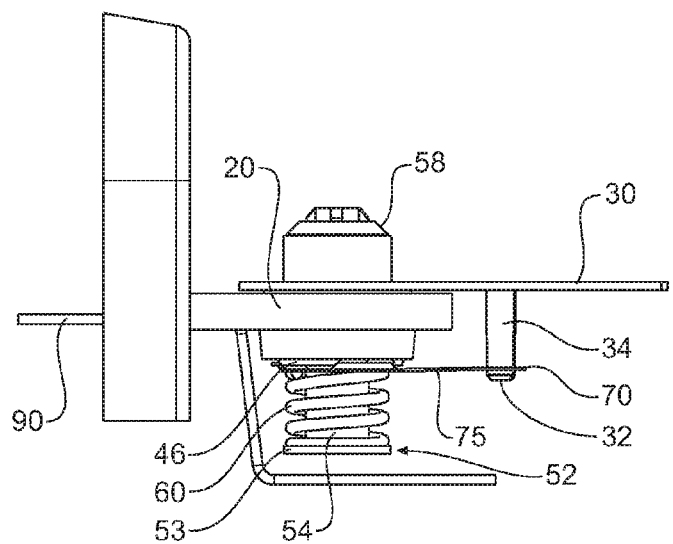
FIG. 13B shows the pivot mechanism of FIGS. 10 and 11 in a side view in a position departing the drive detent.

FIGS. 10 and 11 show a pivot mechanism 10 for a vehicle external rear view mirror assembly. The mechanism 10 includes a base frame portion 20 for a vehicle mountable base frame 21. The mechanism 10 also includes a case frame portion 30 mounted to the base frame 20 for rotation about a pivot axis 12. A detent 40, operable between the base frame portion 20 and the case frame 30, is also provided. The detent 40 has an engaged position where the case frame portion 30 is held in a selected position with respect to the base frame portion 20. The detent 40 also has a disengaged position allowing the rotation about the pivot axis 12.

The detent 40 includes a first set of detent features 42 and a second set of detent features 46.

A spring mechanism clamping the case frame portion 30 to the base frame portion 20 and the first set of detent features 42 to the second set of detent features 46 is also provided.

A spring mechanism clamping the case frame portion 30 to the base frame portion 20 in the the first set of detent features 42 to the second set of detent features 46 is also shown in FIGS. 10 and 11. This spring mechanism also forms a part of the pivot mechanism 10.

A support arm 70 having a first attachment end 72 and a second floating end 78 also forms a part of the pivot mechanism 10. The second floating end 78 of the support arm 70 supports the first set of detent features 42. The first set of detent features 42 are fixed against rotation with respect to the support arm 70. However, they are displacable relative to the case frame portion 30 in a direction substantially parallel to the pivot axis 12.

The spring mechanism shown in FIGS. 10 and 11 includes a coil spring 60. In other embodiments of the invention, a coil spring is not used. In such other embodiments, the support arm 70 may function to provide sufficient spring force such that a separate coil spring is not required.

The pivot mechanism 10, as described above and as is illustrated in FIGS. 10 to 14C, produces first and second clamping forces that arise from the combined effect (sum) of a first spring force produced by the compression spring 50 and a second spring force produced by the resilient arm portion 75. In contrast, in other embodiments, such as the embodiment illustrated in FIGS. 15 to 18D, the first and second clamping forces may arise from a spring force produced only by a resilient arm portion 75.

Referring now to FIGS. 12A to 12C, it can be seen that the first set of detent features 42 is mounted on the detent member support arm 70. The detent member support arm 70 is attached to screw receiving bosses 34 by screws 32, as is most clearly shown in FIGS. 12B and 12D.

Figure 14A:
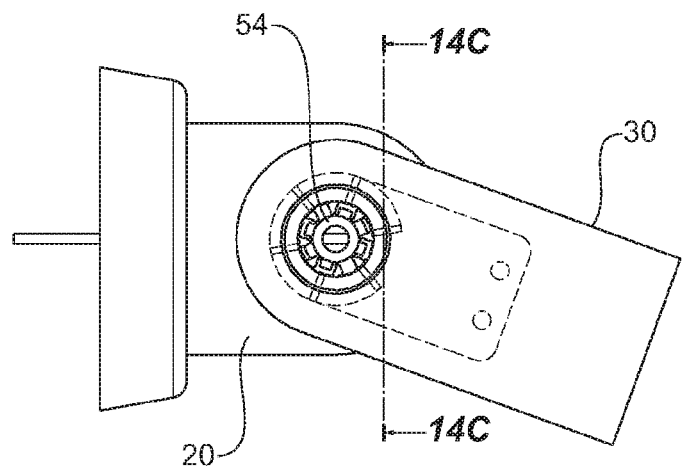
FIG. 14A shows the pivot mechanism of FIGS. 10 and 11 in a top view in the out of detent position.
Figure 14C:
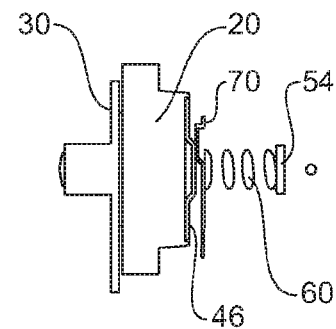
FIG. 14C shows the pivot mechanism of FIGS. 10 and 11 in a cross-sectional view taken through section lines 14C-14C, as indicated on FIG. 14A.
Figure 14B:
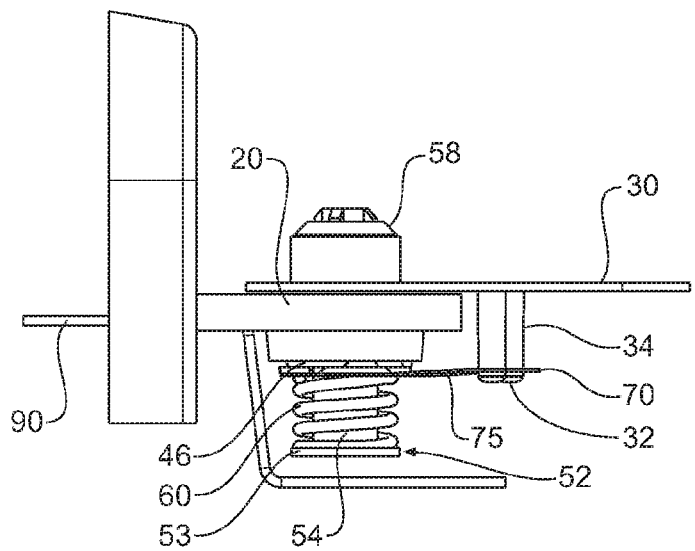
FIG. 14B shows the pivot mechanism of FIGS. 10 and 11 in a side view in the out of detent position.
Figure 15:
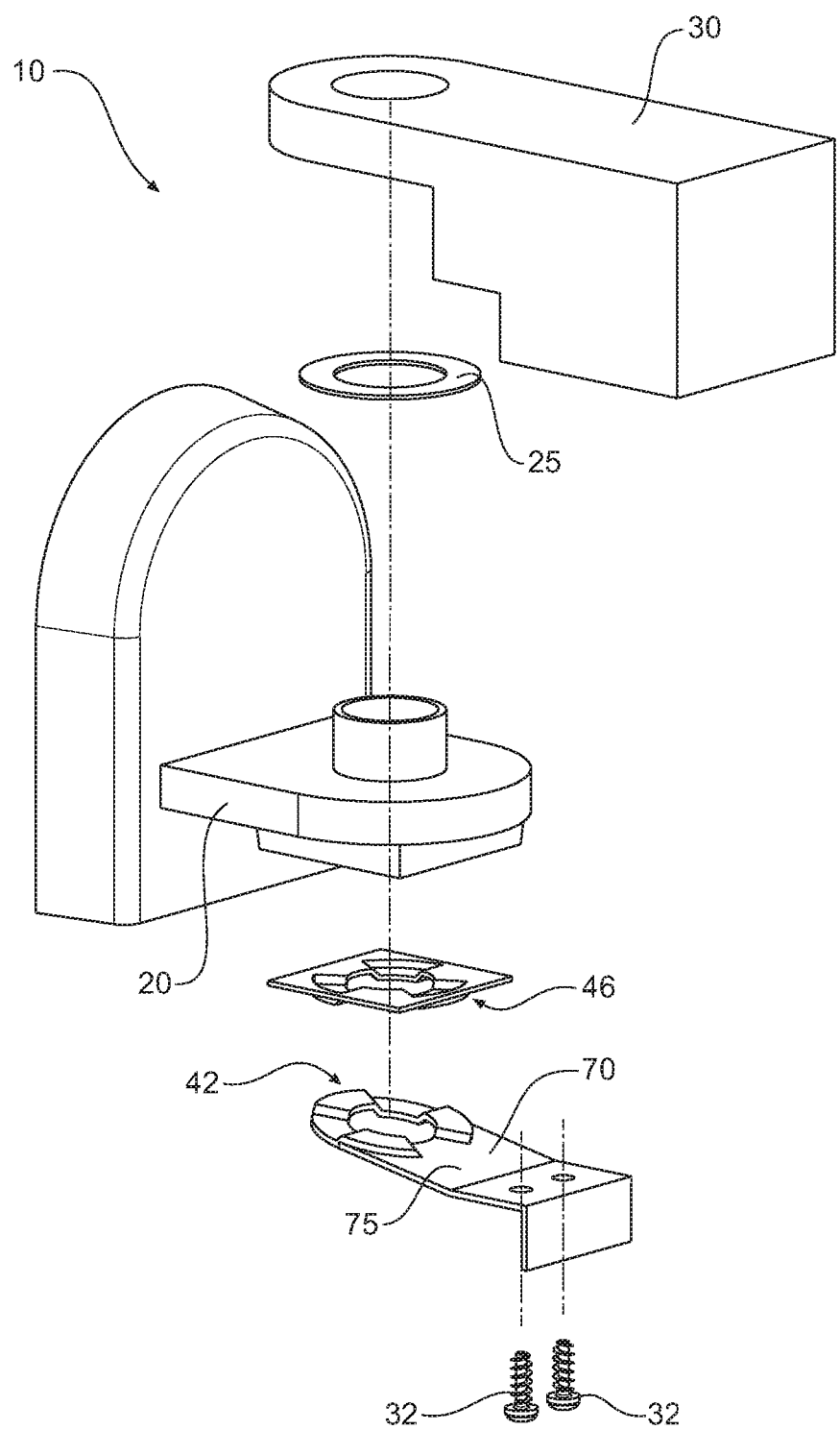
FIG. 15 is a similar view to FIGS. 1, 7 and 10 but shows an exploded isometric view of a pivot mechanism according to a further alternative embodiment of the invention.
Figure 16:
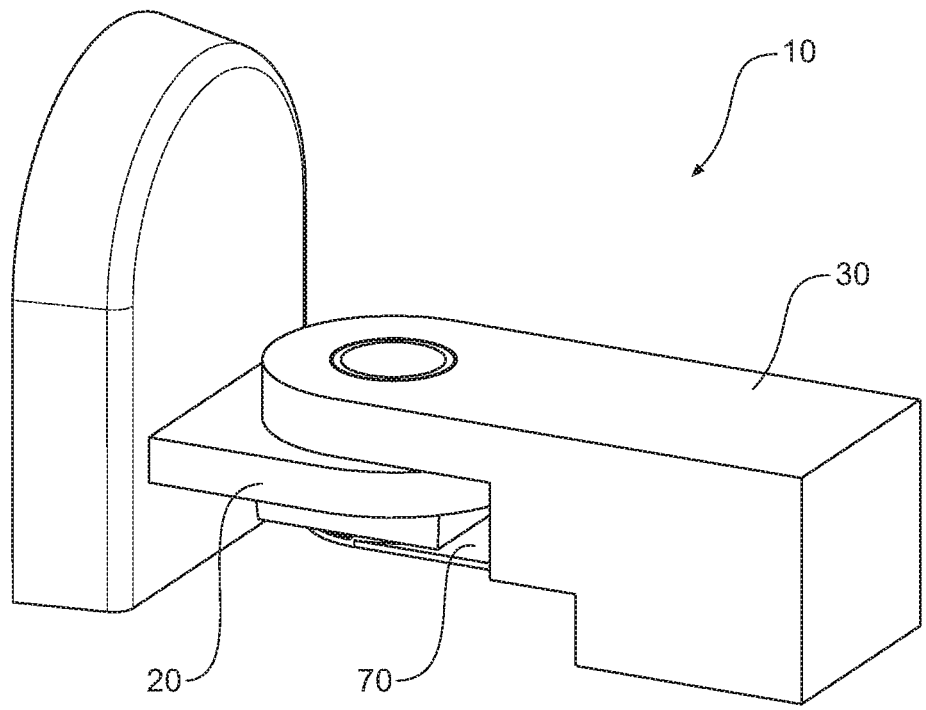
FIG. 16 is an isometric view of a pivot mechanism shown in FIG. 15.
Figure 17:
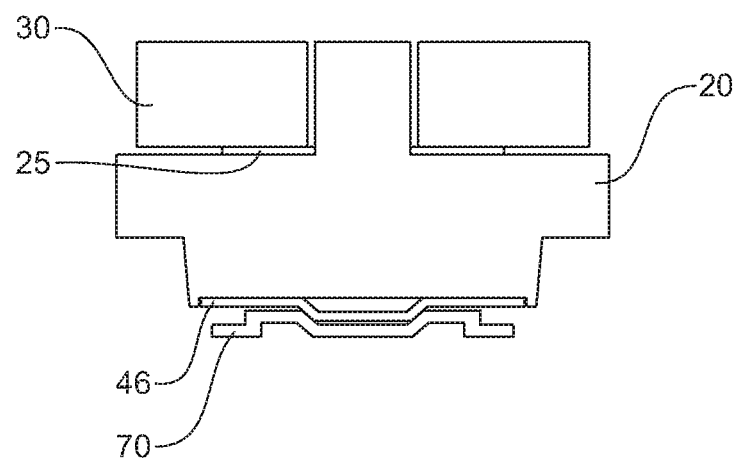
FIG. 17 shows the pivot mechanism of FIG. 16 in the drive detent position, in a cross-sectional view taken through section lines 17-17, as indicated on FIG. 18A.

The detent member support arm is flexible, allowing the first set of detent features 42 to move axially away from the second set of detent features 46 in the position shown in FIG. 14C. The detent member support arm 70 is, however, relatively inflexible against rotational movement with respect to the case frame 30. The progressive axial movement of the support arm 70 is shown from FIGS. 13A to 13C, departing the drive detent, to FIGS. 14A to 14C, which show the relative positions out of the detent.

The spring mechanism provides a first clamping force clamping the case frame portion 30 to the base frame portion 20 and a second clamping force clamping the first set of detent features 42 to the second set of detent features 46, the first and second clamping forces being of equal magnitude. This holds true on the detent position shown in FIGS. 12A to 12D, as well as in the departing detent position shown in FIGS. 13A to 13C and in the out of detent position shown in FIGS. 14A to 14C. The first and second clamping forces are however higher in the disengage position shown in FIGS. 14A to 14C than they are in the engaged position shown in FIGS. 12A to 12D.

In the embodiment shown in FIGS. 10 to 14C, the spring mechanism includes the compression spring 60 and a spring tie 50. The spring tie 50 has a first tie end 52 and a second tie end 58 spaced apart from each other and connected by a tie portion 54. The first spring end 62 bears against the first tie or retaining end 52 of the spring tie 50 and the second spring end 68 bears against the case frame portion 30. The tie portion 54 may be a tube, for instance, as is shown in FIG. 1. Alternatively, the spring tie may be solid. The tie portion 50 passes through the spring 60, as is shown in FIGS. 10 and 11. The second tie end 58 is separable from the tie portion 50 for assembly.

The spring mechanism includes a resilient arm portion 75. The resilient arm portion 75 is located between the first attachment end 72 and the second floating end 78 of the support arm 70.

The support arm 70 and the first set of detent features 42 are formed from a single unitary component, being a pressed sheet of steel so as to form a unitary case plate. In other embodiments, not shown, these components may be separate with a case plate backbone supporting a detent ring for instance.

With each of the pivot mechanism embodiments of the invention described above, the relative axial positions of the base frame portion 20 and the case frame portion 30 remain unchanged from between the engaged position and the disengaged position. This "zero lift" gives reduced and consistent gaps between parts of the mirror assembly. This results in: aesthetic improvement and reduces wind noise. The overall vertical package space required for the pivot mechanisms of the invention tend to be reduced. This provides further benefits in overall mirror assembly design.

In each of the embodiments described above, a spring tie 50 is employed. The spring tie may conveniently take the form of a tube as is illustrated in the FIGS. 1 and 7 for instance. Its primary function however is to act as a tie in transmitting a tension force, the force coming from the spring assembly. Therefore, in other embodiments of the invention, the spring tie need not be a tube, but may take alternative forms.

Now turning to FIGS. 15 to 18D, a further embodiment of the invention is shown. With this embodiment of the invention, no coil spring is required. Instead, the first and second clamping forces referred to above are generated by the resilient arm portion 75 of the support arm 70. FIGS. 18A, 18B and 18C show the support arm 70 and the resilient arm portion 75 in an engaged condition where the case frame portion 30 is held in a selected position with respect to the base frame portion 20.

FIG. 18D shows the support arm 70' in dotted outline, the dotted outline representing the position the arm 70 would be in if not displaced downwards by the assembly. The resilient arm portion 75 is responsible for the spring force generated by the arm 70.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A pivot mechanism for a vehicle external rear view mirror assembly, the mechanism including:
    a base frame portion integral with, or attachable to, a vehicle-mountable base frame;
    a case frame portion mounted to the base frame portion for rotation about a pivot axis, the case frame portion integral with, or attachable to, a case frame adapted to support a rear vision mirror;
    a detent operable between the base frame portion and the case frame portion, the detent having:
        an engaged position where the case frame portion is held in a selected position with respect to the base frame portion, and a disengaged position allowing the rotation about the pivot axis, the detent including a first set of detent features and a second set of detent features;
    a spring mechanism clamping the case frame portion to the base frame portion and the first set of detent features to the second set of detent features; and
    a support arm having an attachment end and a floating end, the floating end supporting the first set of detent features, the first set of detent features fixed against rotation about the pivot axis with respect to the support arm, but displaceable relative to the attachment end in a direction substantially parallel to the pivot axis,
    wherein the attachment end of the support arm is fixed to, and is fixed against rotation with respect to, one of: the case frame portion and the base frame, and
    wherein the second set of detent features is fixed against rotation with respect to the other of: the case frame portion and the base frame portion.

2. The pivot mechanism as claimed in claim 1 wherein the spring mechanism provides a first clamping force clamping the case frame portion to the base frame portion and a second clamping force clamping the first set of detent features to the second set of detent features, the first and second clamping forces being of equal magnitude.

3. The pivot mechanism as claimed in claim 2 wherein the first and second clamping forces are higher in the disengaged position than they are in the engaged position.

4. The pivot mechanism as claimed in claim 1 wherein the spring mechanism includes:
    a compression spring; and
    a spring tie, the spring tie having a first tie end and a second tie end, the first and second tie ends spaced apart from each other and connected by a tie portion, the tie portion passing through the spring.

5. The pivot mechanism as claimed in claim 4 wherein the spring mechanism includes a resilient arm portion, the resilient arm portion between the attachment end and the floating end of the support arm.

6. The pivot mechanism as claimed in claim 5 wherein the spring mechanism provides a first clamping force clamping the case frame portion to the base frame portion and a second clamping force clamping the first set of detent features to the second set of detent features, the first and second clamping forces arise from the sum of a first spring force produced by the compression spring and a second spring force produced by the resilient arm portion.

7. The pivot mechanism as claimed in claim 1 wherein the support arm and the first set of detent features are formed as a unitary component.

8. The pivot mechanism as claimed in claim 1 wherein the support arm and the first set of detent features are formed from spring steel.

9. The pivot mechanism as claimed in claim 1 wherein the relative axial positions of the base frame portion and the case frame portion remain unchanged from between the engaged position and the disengaged position.

10. The pivot mechanism as claimed in claim 1 wherein the spring mechanism includes:
   a resilient arm portion, the arm resilient arm portion between the attachment end and the floating end of the support arm.

11. The pivot mechanism as claimed in claim 1 wherein the spring mechanism consists of the arm portion, the arm portion including a resilient arm portion between the attachment end and the floating end of the support arm.

12. The pivot mechanism as claimed in claim 1 wherein the attachment end of the support arm is attached to the case frame portion.

\* \* \* \* \*